Nov. 7, 1939.   R. A. MacDONALD   2,179,157
TAP AND METHOD OF USE IN MAKING LOCK NUTS
Filed Aug. 13, 1938
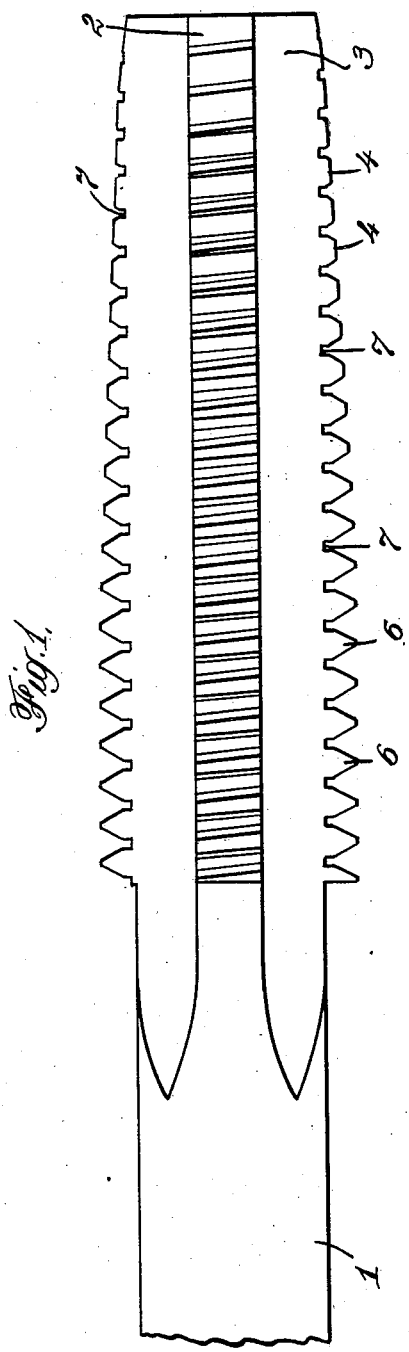
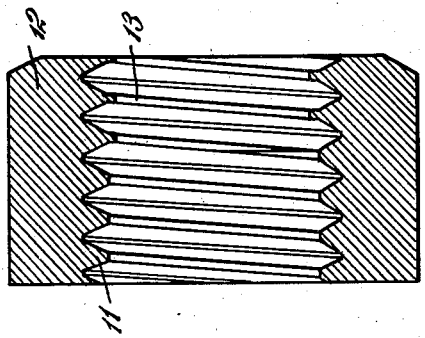
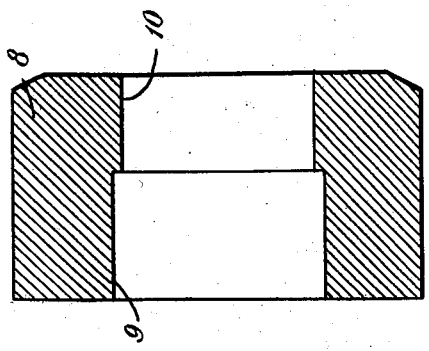
INVENTOR
Robert G. MacDonald
BY
Pennie Davis Marvin & Edmonds
ATTORNEYS Patented Nov. 7, 1939

2,179,157

UNITED STATES PATENT OFFICE 2,179,157

TAP, AND METHOD OF USE IN MAKING LOCK NUTS

Robert A. MacDonald, Greenwich, Conn., assignor to Russell Burdsall & Ward Bolt & Nut Company, Port Chester, N. Y., a corporation of New York Application August 13, 1938, Serial No. 224,725

4 Claims. (Cl. 10—86)

This invention relates to taps and more particularly to a tap for use in forming lock nuts.

In my copending application, Serial No. 223,387 filed August 6, 1938, I have disclosed and claimed a lock nut having one or more locking threads adjacent one end, the remainder of the nut being provided with normal threads. The present invention is directed to a tap capable of producing said lock nut in a single tapping operation.

In the lock nut of my copending application, the locking threads at the bottom are of the same diameter as the normal threads and the locking threads include a portion of the same size and shape as the normal threads but are provided with extensions at their tops. To produce such threads in a single tapping operation, I provide a blank having a portion of the opening of larger diameter than the remainder and in the tapping operation the normal threads are formed in the larger portion of the nut opening and the locking threads in the smaller portion.

The tap which I employ for the purpose of threading said nut, and which forms the subject matter of the present application, is of the usual construction except that it is provided with an undercut at the bottom of each cutting tooth. The tap is of a size that would be employed normally for threading the larger portion of the nut opening and in the tapping operation, the undercuts play no part in the threading of the larger portion of the nut opening thereby producing normal threads. In the portion of the nut opening of reduced diameter, however, the extra metal enters the undercuts in the tap and provides extensions at the tops of the threads of the nut.

In the accompanying drawing I have illustrated one form of my invention. In this showing:

Fig. 1 is an elevation of the tap;

Fig. 2 is a transverse, sectional view of an unthreaded nut blank used in conjunction with the tap; and Fig. 3 is a similar view of the threaded nut.

The body of the tap is of the usual construction consisting of a shank 1 having a plurality of lands 2 spaced or separated from each other by clearance grooves 3. The tap shown is of the tapered type in which the nut blanks to be threaded are fed on to one end of the tap and removed at the other end. Each of the lands is provided with a plurality of cutting teeth, the teeth being helically arranged in the usual manner to progressively cut a thread in the nut blank. At the forward or tapered end of the tap the teeth 4 form but a portion of the finished tooth in the nut blank, the tap gradually increasing in diameter until at a point near the rear end of the tap where the teeth 6 are of the same cross section as the teeth to be produced in the nut blank. At the bottom of the body portion of each tooth, however, I provide an undercut 7 which is provided with a cutting edge and is adapted to form extensions on the locking teeth of the nut. These undercuts as shown are substantially rectangular in cross section but may be of any desired cross section.

The blank to be threaded by the tap is shown in Fig. 2 of the drawing. As shown blank 8 is provided with a central opening, a portion 9 of which is of one diameter and the remaining portion 10 of which is of a less diameter. In producing lock nuts with taps of the present invention the tap to be used is of a diameter that would normally be used in threading the portion 9 of the nut. When the tap shown in Fig. 1 is passed through this portion of the nut blank, it produces normal threads 11 shown in the threaded nut 12 in Fig. 3 of the drawing. As there is no metal present to be received in the undercut portions 7 of the teeth of the tap, the operation of the tap throughout the portion 9 of the nut blank is the same as if the undercut portions were not present. However, when the tap enters the portion 10 of the nut blank opening of reduced diameter, the additional metal is received in the undercut portions 7 forming extensions 13 on the tops of the threads, which extensions serve as locking means when the nut is later used in conjunction with a bolt. The extensions 13 shown in Fig. 3 of the drawing are substantially rectangular in cross section corresponding to the undercut portion 7. As stated, extensions of any desired cross section may be formed by employing undercut portions of suitable cross section.

The advantages of the tap herein disclosed will be apparent. By employing such tap in conjunction with this special blank shown in Fig. 2 of the drawing, lock nuts may be produced in a single tapping operation and thereby at no greater cost than the cost of producing ordinary nuts. Likewise the invention is applied to continuous taps in which nut blanks are fed on one end of the tap and the threaded nuts pass off at the other end. The tap may also be used in place of an ordinary tap for producing nuts of ordinary construction because when the opening in the nut blank is not provided with a reduced portion, the undercut portions 7 of the tap threads play no part in the threading operation.

I claim:

1. A tap for use in threading a nut blank having an opening with portions thereof of different diameter, said tap comprising a plurality of lands and clearance grooves separating said lands, cutting teeth formed on said lands and arranged helically of the body of the tap, the diameter of the tap at the bottom of the body portion of the teeth being equal to the diameter of the larger portion of the blank whereby the body portion of the teeth function to cut normal threads in the larger portion of the opening in the nut blank, the body of the tap being provided with undercut portions at the bottoms of the teeth providing cutting means operable in the portion of the blank of smaller diameter to form extensions on the tops of the teeth of the nut in that portion of the nut blank.

2. A tap for use in threading a nut blank having an opening with portions thereof of different diameter, said tap comprising a plurality of lands and clearance grooves separating said lands, cutting teeth formed on said lands and arranged helically of the body of the tap, the diameter of the tap at the bottom of the body portion of the teeth being equal to the diameter of the larger portion of the blank whereby the body portion of the teeth function to cut normal threads in the larger portion of the opening in the nut blank, the body of the tap being provided with undercut portions at the bottoms of the teeth providing cutting means operable in the portion of the blank of smaller diameter to form extensions on the tops of the teeth of the nut in that portion of the nut blank, said undercut portions being substantially rectangular in cross section.

3. A tapered tap comprising a plurality of lands and clearance grooves separating said lands, cutting teeth formed on said lands and arranged helically of the body of the tap, the tap tapering in diameter toward one end, said tap being adapted for use in threading a nut blank having an opening with portions thereof of different diameters, the diameter of the tap at the bottom of the body portion of the teeth being equal to the diameter of the larger portion of the blank and being adapted to cut normal threads in that portion of the blank, the body of the tap being provided with undercut portions at the bottoms of the body portion of the teeth providing cutting means operable in the portion of the blank of smaller diameter to form extensions on the tops of the threads of the nut in that portion of the nut blank.

4. The method of making a nut lock which comprises forming a blank having an opening with a portion of uniform diameter and a second portion of a uniform, but smaller diameter, and threading the blank in a continuous operation to form normal threads in the portion of larger diameter and threads provided with extensions at their tops in the portion of smaller diameter.

ROBERT A. MacDONALD.